(12) United States Patent
Fecht et al.

(10) Patent No.: US 7,317,865 B2
(45) Date of Patent: Jan. 8, 2008

(54) METHOD AND APPARATUS FOR CONVERTING AND OPTIMIZING EDITING FILES

(75) Inventors: Damon Carlyle Fecht, Tarzana, CA (US); Ryan Thomas Bates, Los Angeles, CA (US); Christopher Joseph Duxler, Rancho Cordova, CA (US); Manuel Federico de la Cerra, Carlsbad, CA (US)

(73) Assignee: Reel Revival, LLC, Woodland Hills, CA (US)

( * ) Notice: Subject to any disclaimer, the term of this patent is extended or adjusted under 35 U.S.C. 154(b) by 1372 days.

(21) Appl. No.: 10/231,776

(22) Filed: Aug. 28, 2002

(65) Prior Publication Data

US 2004/0041943 A1   Mar. 4, 2004

(51) Int. Cl.
*G11B 27/00* (2006.01)
*H04N 5/93* (2006.01)

(52) U.S. Cl. .................. 386/55; 386/131; 386/109; 348/441

(58) Field of Classification Search .................. 386/55, 386/109, 131; 348/441
See application file for complete search history.

(56) References Cited

OTHER PUBLICATIONS http://www.convertmyedl.com/.*
http://www.apple.com/cinematools/film.html.*
http://www.trakkertech.com/index.htm web pages (8 pages).
http://www.convertmyedl.com/ web pages (6 pages).
http://www.apple.com/cinematools/film.html web pages (10 pages).
http://www.uscomputamatch.com/navigation.htm web pages (8 pages).

* cited by examiner

*Primary Examiner*—Thai Q. Tran
*Assistant Examiner*—Girumsew Wendmagegn
(74) *Attorney, Agent, or Firm*—Manuel de la Cerra

(57) ABSTRACT

A method and apparatus for generating a converted edit file based on an original editing file, by correlating the various entries of the original edit file and calculating new editing data to be used in the converted edit file. The method further optimizes the HDTV-TL by systematically merging adjacent film segments thus minimizing the cost/time to telecine those merged film segments.

38 Claims, 10 Drawing Sheets

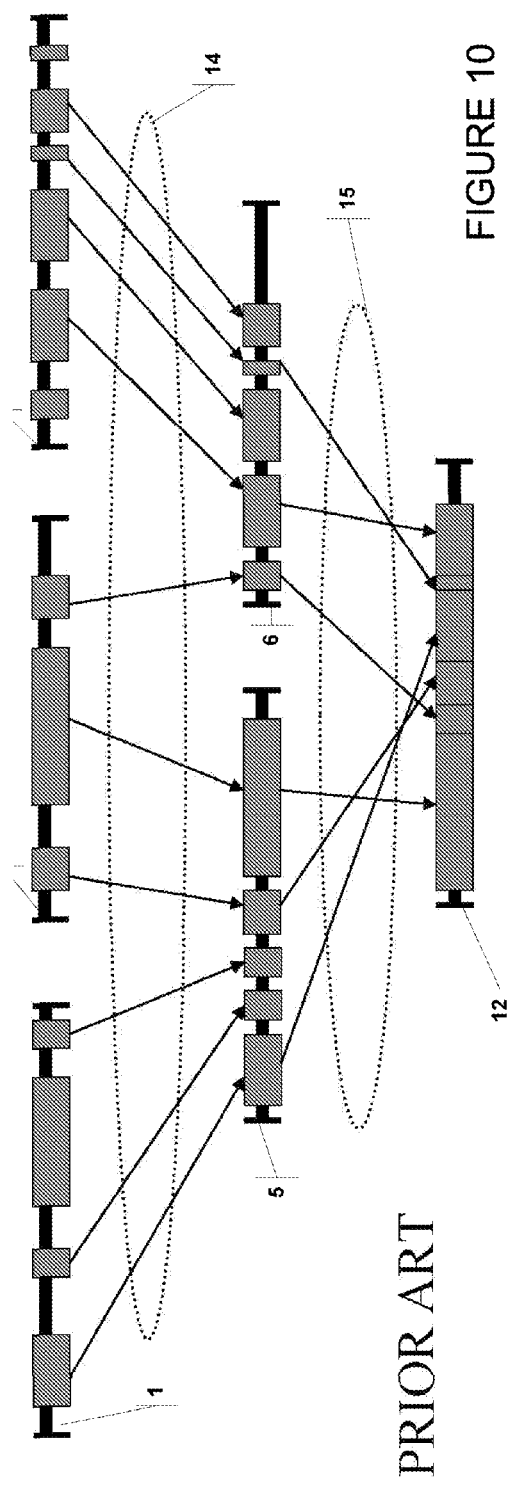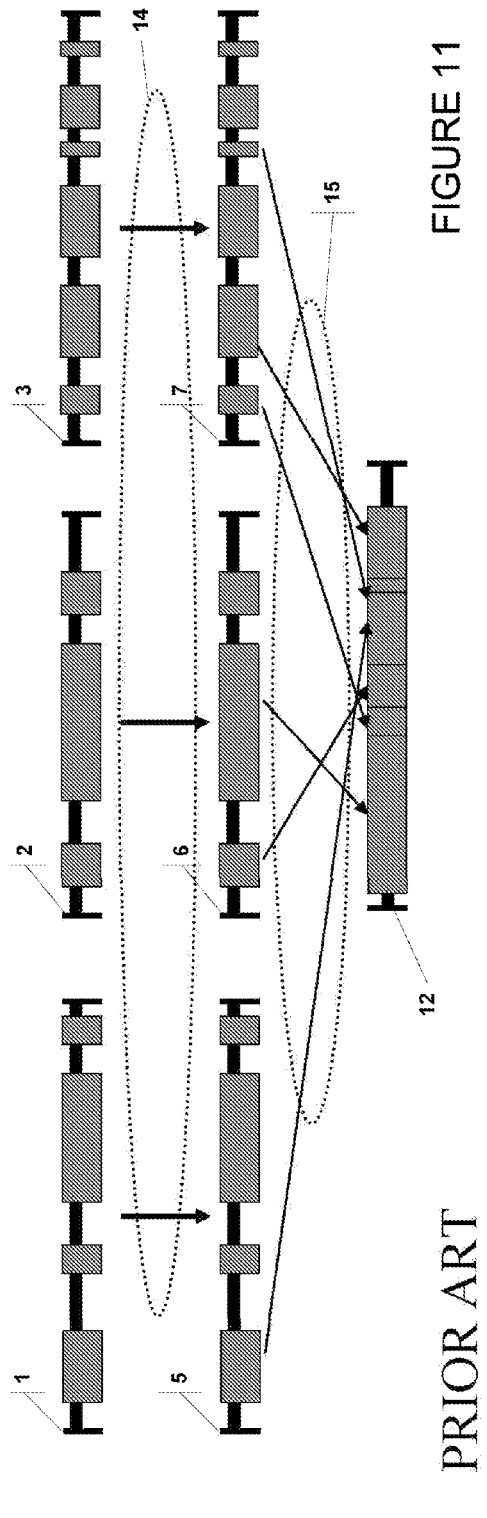

METHOD AND APPARATUS FOR CONVERTING AND OPTIMIZING EDITING FILES

FIELD OF THE INVENTION

The present invention relates to data processing that appertains to the motion picture arts. In particular, the present invention relates to a method of processing data representing an edit decision list and a telecine log.

BACKGROUND OF THE INVENTION

In an effort to open up overly congested airways and deliver high quality television images, several countries are currently exploring converting from an analog signal infrastructure to a digital signal infrastructure. Converting to digital signals frees up bandwidth so that all devices, such as cellular phones and police and air traffic control systems, can operate more safely and efficiently. In addition, converting to digital signals allows television broadcasters to deliver a signal that generates a picture quality that can be up to 94% of the resolution of 35 mm print film. The quality of this picture is so amazing that many video and film engineers cannot even distinguish it from a picture generated from an actual 35 mm print.

The United States is among the countries exploring digital signal infrastructure. In particular, the United States Congress has mandated that most television broadcasters convert from analog signals using the National Television Standards Committee (NTSC) standard to digital signals using the Advanced Television Systems Committee (ATSC) standard (conventionally known as the High Definition Television (HDTV) standard) by 2006. As part of that mandate, on Aug. 8, 2002 the United States Federal Communications Commission voted to require television manufacturers to add digital tuners to all television sets with screens of 36 inches and larger by July 2005, while the requirement for smaller sets would be phased in over the following two years. (MM Docket No. 00-39, Adopted Aug. 8, 2002).

Unfortunately, television broadcasters have been slow to fulfill the potential of this new digital format. Though some new television programs are being recorded in HDTV, there is not enough digital subject matter to meet viewer demand. To alleviate this problem, a number of broadcasters have attempted to convert older television shows to the HDTV standard and have found that the cost for post-production facilities to perform the conversions using standard editing methods is simply too high.

Most television shows are shot on 16 mm or 35 mm film. Prior to the late 1990s, depending on budgets at the time, studios edited shows for broadcast using one of two methods. Both methods create a high-end NTSC videocassette, an edited master, of the assembled show for NTSC broadcast. The first method, known as the negative cutting process, required that an editor identify the final negative segments, cut out final negative segments from the original negatives, and bind those cut negative segments into an assembly reel. This assembly would then be printed as one piece of film, a composite, in a film lab before being transferred to NTSC video, through the telecine process, for broadcast. This was one of the most commonly used high quality methods available in the early 1980s.

With the rise of video editing and the birth of digital video editing, a generally less expensive second method, known as on-line editing, became possible. This method required that all the original negative segments be transferred to NTSC video and assembled in an electronic editing bay for broadcast. To better understand the on-line editing, FIG. 9 illustrates the prior art method of an NTSC program assembly using on-line editing. As discussed above, many television programs use 35 mm film as the original recordation media. The size of the film (i.e., 35 mm) is known as the gauge of the film. This film has several frames, with each frame having a unique number associated with it. This number is known as a keycode. For example, in 35 mm the film stock manufacturer imprints a unique imprinted keycode every 64 perforations. The distance between imprinted keycodes is known as a keyfoot. Cameras generally record images on the 35 mm film at one frame per four perforations. Accordingly, 35 mm film has 64 perforations per keyfoot (PPK) and 16 frames per keyfoot (FPK). Knowing the unique imprinted keycode immediately before the relevant frame, plus the offset of frames from that keycode will give you the unique keycode for that frame. As with 35 mm, other film gauges have unique keycodes based on a similar offset method. For example, 16 mm has 20 or 40 PPK and either 20 or 40 FPK; and 70 mm has 120 PPK with either 24 or 8 FPK.

The original film rolls 1-3 are fed into a NTSC telecine bay 4 that transfers the film images into NTSC source tapes 5-7. While FIG. 9 illustrates N-number of original film rolls and K-number of NTSC source tapes, it is possible that only one original film roll and/or only one NTSC source tape be used in the assembly of the NTSC program. At the NTSC telecine bay 4 a telecine operator makes telecine decisions 8 regarding which possible segments may be needed in the development of the final video program. For example, a director may shoot several different segments at multiple angles for any given scene. The director may then direct the telecine operator to transfer all those segments at the various angles so that the director may view each alternative and select the appropriate one at the off-line editing bay 9 described below.

The NTSC telecine bay 4 keeps track of each of the telecine decisions 8 in the form of a NTSC telecine log (NTSC-TL) 10. This log 10 is often called a Flex File. Other common proprietary formats for the log 10 include Key Log, Evertz, Avid Log Exchange, Aaton, Key Scope and Log Producer. Notwithstanding the proprietary format, the log 10 usually has several entries, with each entry containing general information that may include the following:

(a) film roll number (i.e., 1, 2 or 3) describing the actual film roll from which the entry's segment was taken;

(b) source tape number (i.e., 5, 6, or 7) describing the NTSC source tape to which the entry's segment was transferred;

(c) scene number describing the scene number for the entry's segment;

(d) take number describing the scene take number for the entry's segment;

(e) flash timecode IN describing the timecode in HH:MM:SS:FF (Hours:Minutes:Seconds:Frames) format for the source tape start position for the entry's segment;

(f) flash timecode OUT describing the timecode in HH:MM:SS:FF format for the source tape end position for the entry's segment;

(g) flash keycode IN describing the unique keycode for the start film frame for the entry's segment;

(h) flash keycode OUT describing the unique keycode for the end film frame for the entry's segment;

(i) gauge of the film describing the size of the film; and (j) other miscellaneous information such as sound timecodes, project title, production company, the name of the telecine operator, the machines used in telecine, date of the telecine transfer, and date when the segment was taken.

After the telecine operator transfers the original film rolls 1-3 to NTSC source tapes 5-7, those source tapes are fed into an off-line editing bay 9 where an editor makes edit decisions 11 regarding which segments should be included in the edited NTSC master 12. In addition to selecting the appropriate segments, the editor must order those segments. As with the telecine decisions 8, the director may play a significant role in selecting the final segments and their appropriate ordering. Others may also play a role in final segment selection including content providers, producers, editors and visual effects supervisors. All of the edit decisions 11 at the off-line editing bay 9 are recorded in an NTSC edit decision list (NTSC-EDL) 13. This list 13 usually has several entries, with each entry containing general information that may include the following:

(a) project title;
(b) assembly number describing the relative ordering of the entry's segment;
(c) source tape number describing the NTSC source tape (i.e., 5, 6, or 7) where the entry's segment is located;
(d) source timecode IN describing the timecode in HH:MM:SS:FF format for the start location on the source tape for the entry's segment;
(e) source timecode OUT describing the timecode in HH:MM:SS:FF format for the end location on the source tape for the entry's segment.
(f) destination timecode IN describing the timecode in HH:MM:SS:FF format for the start location on the destination tape for the entry's segment;
(g) destination timecode OUT describing the timecode in HH:MM:SS:FF format for the stop location on the destination tape for the entry's segment; and
(h) scene and clip name for the entry's segment.

The NTSC-EDL 13 is then fed into an on-line editing bay 14 that automatically assembles the edited NTSC master 12, by transferring the appropriate video footage described in the NTSC-EDL 13 from the NTSC source tapes (5, 6, or 7).

FIGS. 10 and 111 illustrate the transfer of segments from the original film rolls 1-3 to the edited NTSC master 12 just described. In FIG. 10 the original film rolls 1-3 are represented as a line of footage with potentially relevant segments shown as gray blocks. The gaps between the gray blocks represent non-usable footage. For example, before a slate marks the scene and the relevant footage begins, directors or camera operators often let the cameras run while the cast and crew come into position. The telecine operator makes telecine decisions 8, shown as arrows 14, as to which segments may be used in the edited NTSC master 12. Here in FIG. 10, the telecine decisions 8 rejected one segment from film roll 1 and two segments from film roll 3, and transferred the remaining segments to NTSC source tapes 5 and 6. Then the editor must make editing decisions 11, shown as arrows 15, as to which segments will be used in the edited NTSC master 12, and the ordering of those segments. In this example, two segments from NTSC source tape 5 and two segments from source tape 6 did not make the final cut, and relevant segments from the two source tapes 5 and 6 are reordered in the edited NTSC master 12.

FIG. 11 is similar to FIG. 10, but illustrates a complete telecine of all original film rolls 1-3 to NTSC source tapes 5-7. In other words, the telecine decisions 8, illustrated as arrows 14, direct that the entire film roll, along with the non-usable gaps, be telecined to the NTSC source tapes 5-7, without rejecting any film footage. Then the editor makes the editing decisions 11, shown as arrows 15, as to which segments will be used in the edited NTSC master 12, and the ordering of those segments.

A director may prefer the alternative illustrated in FIG. 11 over that of FIG. 10 because it allows her to review all the footage and make the edit decisions 11 with all the possible footage alternatives before her. The alternative of FIG. 11, however, is generally more expensive than that of FIG. 10 because the telecine process is very expensive and is dependent on the amount of footage actually telecined. Thus, it is generally less expensive to know which scenes may be used in the edited NTSC master 12, and direct the telecine operator to telecine only those scenes. Oftentimes the director and editor do not know beforehand which segments will ultimately be used, but have a general idea as to which segments would make good candidates for the edited NTSC master 12. Ultimately the process described with reference to FIG. 9 yields an NTSC-TL 10, an NTSC-EDL 13 and an edited NTSC master 12.

In order for these television shows now to be upgraded from NTSC video to higher picture quality of HDTV, it is necessary to use a source with image clarity, or resolution, that is the same as or higher than HDTV. Film negatives, composite prints, and their intermediaries have greater resolution than a HDTV video signal; therefore, for those shows that underwent the negative cutting process, one simply transfers the already assembled film to high definition in a HDTV telecine bay. The resulting cassettes are used for HDTV without noticeable quality loss.

For shows that underwent the on-line editing process described with reference to FIG. 9, several problems exist when converting the NTSC-assembled program to HDTV. First, one simply cannot convert the edited NTSC master 12 to HDTV, nor can one use the NTSC source tapes 5-7 for HDTV conversion because NTSC video quality is substantially lower than HDTV. Second, the edited NTSC master 12 and the NTSC source tapes 5-7 are based on 30 frames per second (FPS), while HDTV is based on 24 FPS—thus, the existing NTSC-TL 10 and NTSC-EDL 13 cannot be used in the HDTV realm. Third, the existing NTSC-TL 10 contains not only the segments used in edited NTSC master 12, but also includes segments that the editor ultimately rejected (see e.g. FIG. 10, NTSC source tape 5 has two rejected segments). Therefore, the NTSC-TL 10 may be over inclusive, requiring very expensive telecine time.

Against the backdrop of these problems, only two options are available for converting the online edited NTSC program to HDTV, however both are risky, costly and time consuming. The first option is to undergo the negative cutting process described above. This requires the labor of a film conformist, a negative cutter, and other editorial aides and equipment to completely reassemble the show. After the negatives are assembled, the assembly is then telecined to HDTV. Unfortunately, every time film technicians handle a film negative, they risk damaging the negative with dirt, hair, scratches or worse. Further, negative cutting is a very precise and rather risky process that when not performed correctly can cause irreparable damage to the original film stock. Cutting negative also eliminates the ability to re-cut a show or use the film stock for future projects.

The second option is to telecine all the negatives to HDTV and then conform the show through HD on-line editing using high-end HDTV editing bays. Because negatives are not cut, this process avoids the risk of causing damage to the original film. However, because a professional editor must spend a significant amount of time sorting through the show's many segments to find each used segment of the show, this process is rather expensive and is still subject to human error. Also, telecining all the negatives to HDTV is very expensive, further driving up the costs.

Therefore, a need exists for a conversion method that increases the efficiency, speed and accuracy of the HD on-line editing process, reducing labor costs and freeing up valuable edit bay time.

SUMMARY OF THE INVENTION

Generally, the invention provides a method for generating a converted edit file based on an original editing file, by correlating the various entries of the original edit file and calculating new editing data to be used in the converted edit file. The newly converted edit file may then be used to re-create the program in a different format. For example, the original editing files may have been for an NTSC program assembly and the method may convert those files to be used in an HDTV program assembly.

In a first aspect of the invention, a flash-to-flash telecine log (FFTL) and a converted edit decision list (CEDL) are constructed from the original editing file, by calculating new source timecode data, new flash timecode data and new source tape numbers. The new source time code data may be calculated from the flash timecode data and source timecode data of the original editing file and at least three of the following lengths: the leader handle, the tailing handle and the segment duration. From the newly calculated data, the proper segments may be transferred from the original film rolls to assemble a new source tape and edited master. Alternatively, the newly calculated data may be used to print the proper negatives and construct a final motion picture.

In a second aspect of the invention, an optimized pull list (OPT-PL) and a optimized edit decision list (OPT-EDL) are constructed from an original editing files, by calculating exact keycode data, new flash timecode data and new source tape numbers. The exact keycodes time code data may be calculated from the flash keycode data and the source timecode data of the original editing file and at least three of the following lengths: the leader handle, the tailing handle and the segment duration. Once the exact keycodes are calculated, segments are merged in various combinations for transfer from the original film roll, and a cost for each combination is examined to achieve a lowest cost. Once the lowest cost is achieved, then a new flash timecode, a new source tape number and a new source timecode data can be calculated. From the newly calculated data, the proper segments may be transferred from the original film rolls to assemble a new source tape and edited master. Alternatively, the newly calculated data may be used to print the proper negatives and construct a final motion picture.

BRIEF DESCRIPTION OF THE DRAWINGS

FIG. 10 illustrates a prior art method of transferring the original film rolls to an edited NTSC master; and FIG. 11 illustrates an alternative prior art method of transferring the original film rolls to an edited NTSC master.

DETAILED DESCRIPTION

Figure 1:
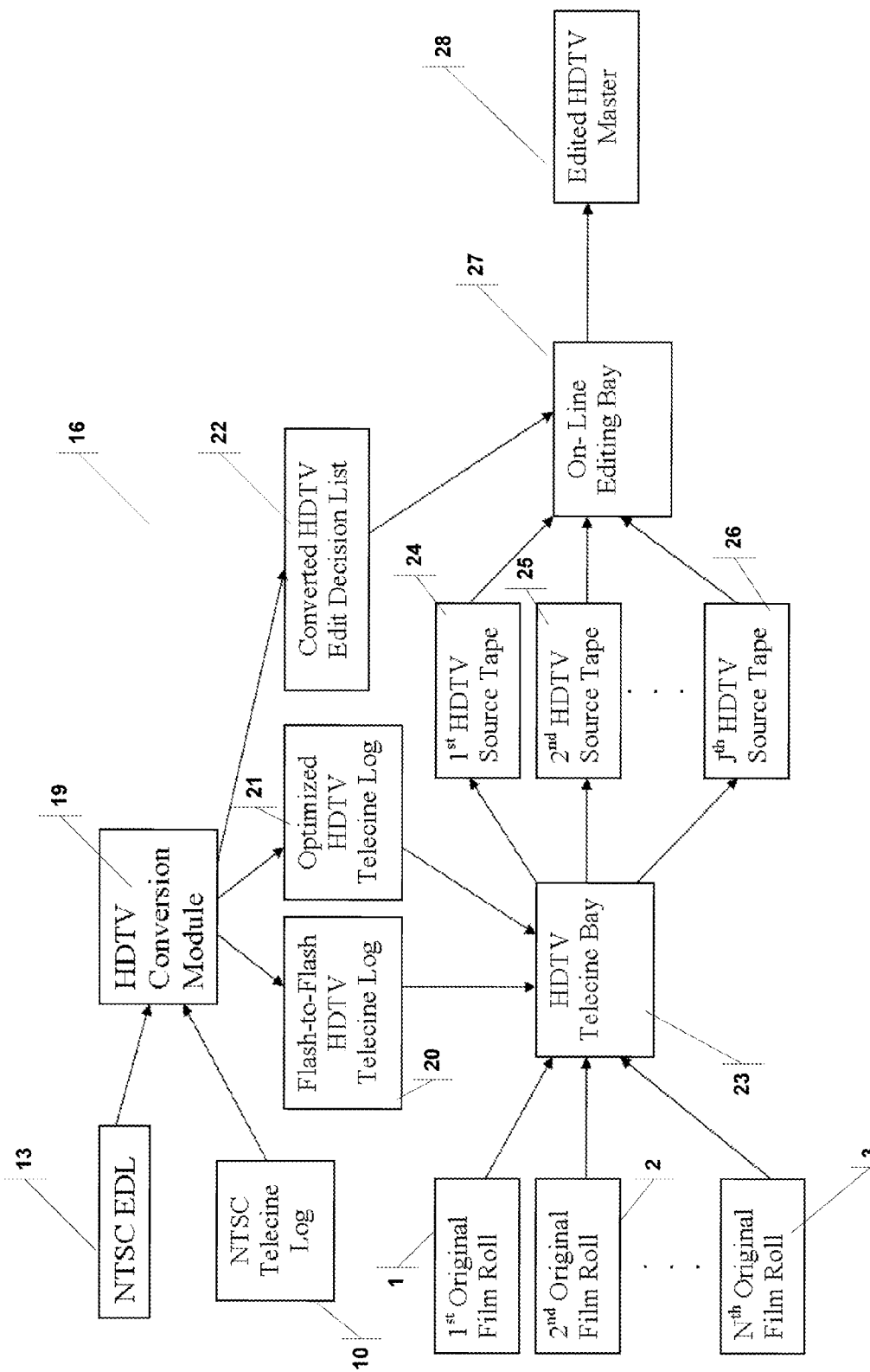
FIG. 1 is a block diagram showing an application of a method according to the present invention.

The present invention solves the problems described above by providing a method and apparatus for converting NTSC editing files into HDTV editing files. FIG. 1 illustrates an example of a method 16 for converting editing files used in HDTV program assembly. Method 16 is advantageously used to convert editing NTSC editing files (i.e., the NTSC-TL 10 and NTSC-EDL 13) into an Flash-to-Flash HDTV telecine log (FF-HDTV-TL) 20 or an Optimized HDTV Telecine Log (OPT-HDTV-TL) 21, and a converted HDTV edit decision list (HDTV-EDL) 22. The method 16 efficiently and accurately produces an edited HDTV master 28 that is of the requisite picture quality for a HDTV broadcast. The method 16 is advantageous to the two options for HDTV conversion discussed above. It avoids the risk of negative cutting inherent in the first option, and obviates the need to hire an editor that will sort through the show segments to find each used segment of the show required with the second option. Finally, the method 16 reduces the amount of telecine time and cost by telecining only the segments needed in the edited HDTV master 28, and discarding unused segments (see e.g. FIG. 10, NTSC source tape 5 has two rejected segments).

Specifically in the method 16, the NTSC-TL 10 and NTSC-EDL 13 are fed into an HDTV conversion module 19 constructed according to the present invention and described in greater detail with respect to FIGS. 2-8. The module 19 generates a HDTV-EDL 22 and a FF-HDTV-TL 20 or an OPT-HDTV-TL 21, where the former TL is described with respect to FIGS. 2-5 and the later is described with respect to FIGS. 6-8. The difference between these two TLs will be described below. Returning to FIG. 1, the same original rolls 1-3 are used and fed into an HDTV telecine bay 23 that converts the original film rolls 1-3 into HDTV source tapes 24-26, as in the NTSC program assembly described with respect to 9. Unlike the NTSC program assembly, however, the telecine decisions 8 are replaced by the converted HDTV-TL (20 or 21). Because the conversion method has information as to the final segments needed for the final HDTV program 28, the amount of telecined footage to the HDTV source tapes 24-26 would likely be less than the amount telecined under the NTSC program assembly. Consequently, the number of HDTV source tapes 24-26 need not be equal to the number of NTSC source tapes 5-7 and would often be less. The HDTV source tapes 24-26 are then fed into an on-line editing bay 27. Again, as with the NTSC telecine decision 8, the NTSC edit decisions 11 are replaced with the converted HDTV-EDL 22. The on-line editing bay 27 then retrieves the needed segments from the HDTV source tapes 24-25, properly orders those segments and constructs an edited HDTV master 28.

Figure 2:
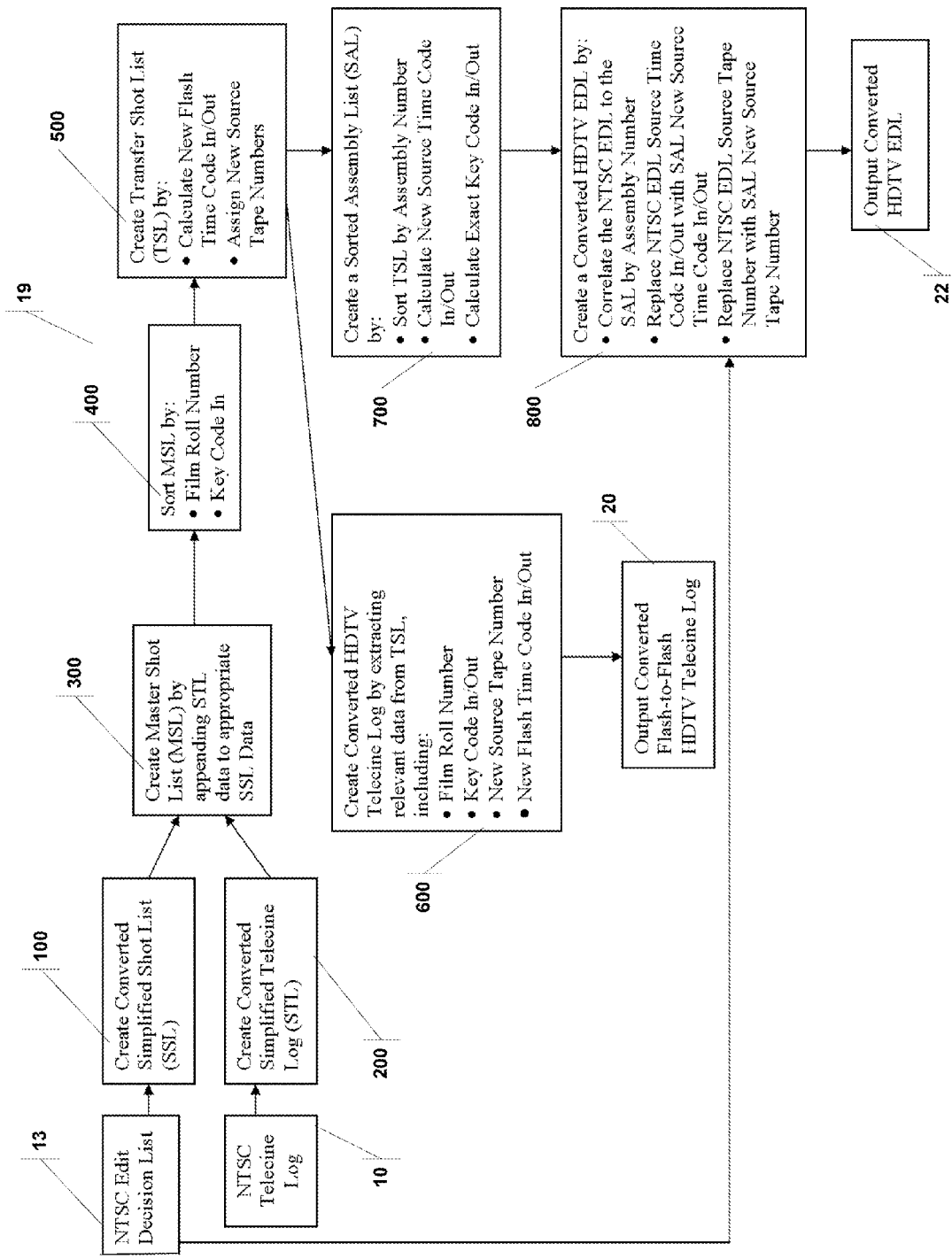
FIG. 2 is a block diagram showing a flow chart of a method of converting NTSC editing files to flash-to-flash HDTV editing files according to the present invention.

FIG. 2 illustrates the steps of a preferred embodiment of the HDTV conversion module 19 that generates a converted FF-HDTV-TL 20 and a converted HDTV-EDL 22. First, in step 100 the NTSC-EDL 13 is copied so as to protect the original information, and the copy is simplified to form a simplified shot list (SSL) by parsing out only the entries that have an assembly number—i.e., the entries that represent segments actually used in the edited NTSC master 12. The timecodes, including the source IN/OUT and destination IN/OUT, from the SSL are also converted from 30 FPS to 24 FPS by multiplying the frame portion of the timecode by 0.8 and rounding down fractions of 0.5 and lower.

Once the source timecodes and destination timecodes have been converted, it is preferable to check if those timecodes synchronize with the each other. This is important because the destination timecodes are synchronized with the audio, thus any drift in synchronization between the source timecodes and the destination timecodes would cause the audio to fall out of synchronization with the images. For example, assume that a particular EDL entry has an unconverted 30FPS-based source timecode with an IN position that ends in frame 01 and an OUT position that ends in frame 07. The IN and OUT position for this entry's source timecode would be converted in 24 FPS to 01 and 06, respectively. Also assume that the entry has unconverted 30FPS-based destination timecode with an IN position that ends in frame 02 and an OUT position that ends in frame 08. The IN and OUT position for this entry's destination timecode would be converted in 24 FPS to 02 and 06, respectively. Thus, the 24 FPS conversion results in an extra frame for the source timecode, thus a frame must be subtracted from the source timecode to synchronize with the destination timecode. It is preferable to subtract the frame from the source timecode OUT because it allows the image to lead the audio for one frame, which is less detectable to a viewer than having the image follow the audio as in the case of subtracting the frame from the source timecode IN. It is also possible that the converted destination timecode could result in a longer segment than the converted source timecode, in which case a frame would be added to the source timecode OUT. The third possibility is that the converted source timecode and converted destination timecodes result in segments of the same size, in which case no adjustment is necessary. Continue this synchronization process until all the SSL entries have been processed.

At step 200, the NTSC-TL 10 is also copied to protect the original information, and the copy is simplified to form a simplified telecine log (STL) by parsing out only the relevant information needed for the conversion, namely the film roll number, the flash timecode IN, the flash timecode OUT, the source tape number, the flash keycode IN, the flash keycode OUT and the gauge of the film. The timecodes of the STL are also converted from 30 FPS to 24 FPS to as described with reference to step 100. It should be apparent to one skilled in the art that while the method is described with particular reference to a 30FPS to 24FPS conversion, the method is equally applicable to conversions among different frame rates (i.e., FPS).

Figure 3:
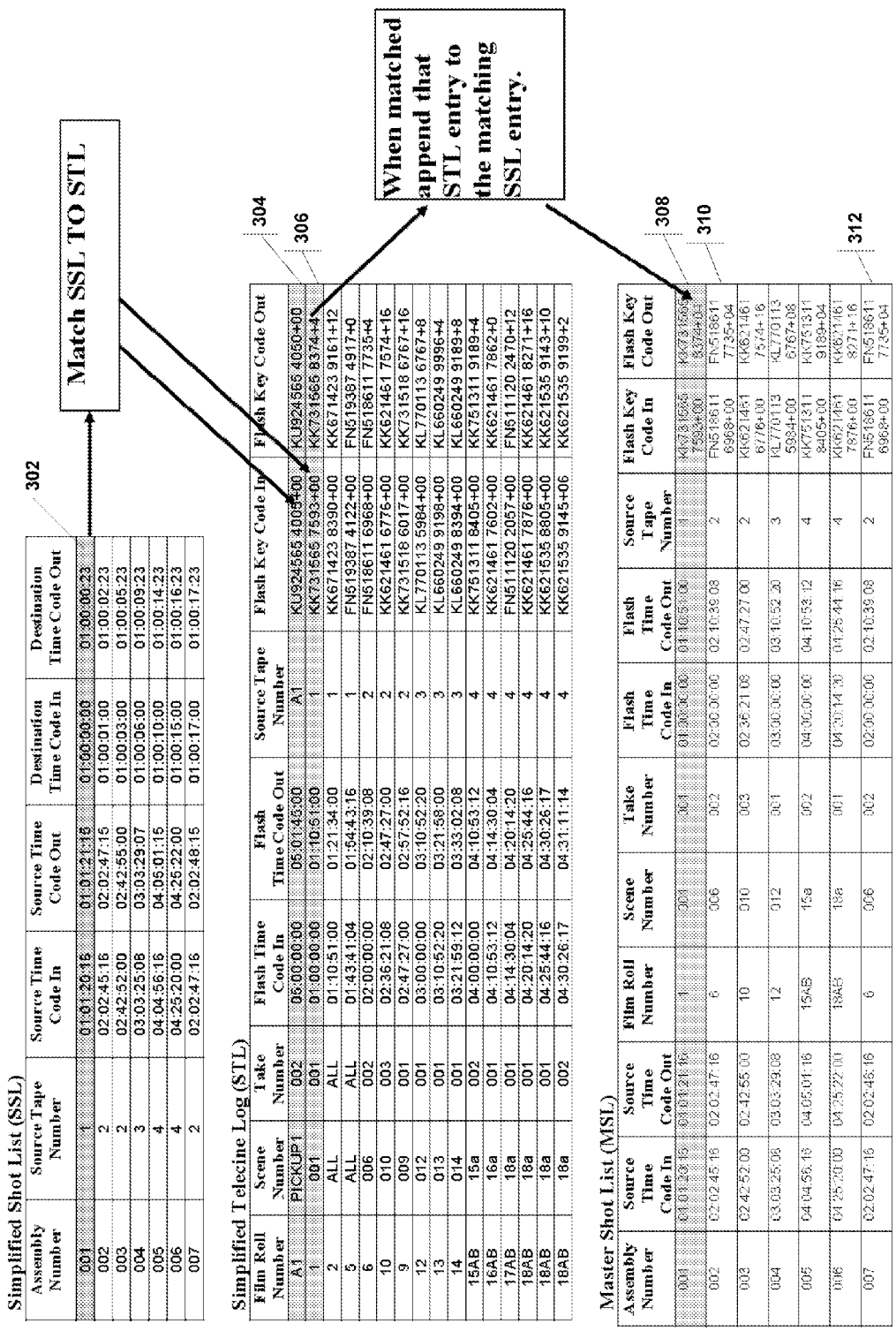
FIG. 3 illustrates the formation of the Master Shot List according to the present invention.

At step 300, illustrated in FIG. 3, the SSL from step 100 and the STL from step 200 are correlated by matching the source tape number and the source timecode IN/OUT of the SSL to the source tape number and the flash timecode IN/OUT of the STL. FIG. 3 illustrates the correlation process for a program filmed on 16 mm film. While illustrated with reference to 16 mm data, this conversion process may be used with other film gauges by modifying the FPK and the frame rates, as necessary. Using FIG. 3 to illustrate, the first SSL entry 302 references source tape 1 and a source timecode range of 01:01:20:16 to 01:01:21:15. This source tape number and source timecode range do not match the first STL entry 304, but do match the second STL entry 306, because the source timecode range of SSL entry 302 falls within the range of STL entry 306. Now that the first SSL entry 302 and the second STL entry 306 match, the data from both of those entries are combined to form the first entry on the master shot list (MSL) 308. Continue this process for all entries in the SSL. While it is possible that each SSL entry matches a unique STL entry, this may not always be the case. For example, the SSL may have an entry that references an identical piece of footage in the STL as is the case in a flashback-sequence. Also, the telecine operator may have transferred several segments from the original film production as a continuous feed to a NTSC source tape; thus while those several segments would have unique entries in the SSL, they would each reference the same continuous STL entry. In other words, the SSL entry would reference the same source tape at different source timecode ranges, but all of those ranges would fall within the same flash timecode range for the continuous STL entry. Fro example, entries 310 and 312 reference the same STL entry, but at different source time code ranges. Finally, not all the STL entries will match to SSL entries. The unmatched STL entries may represent portions of telecined footage that did not make it to the edited NTSC master 12.

Figure 4:
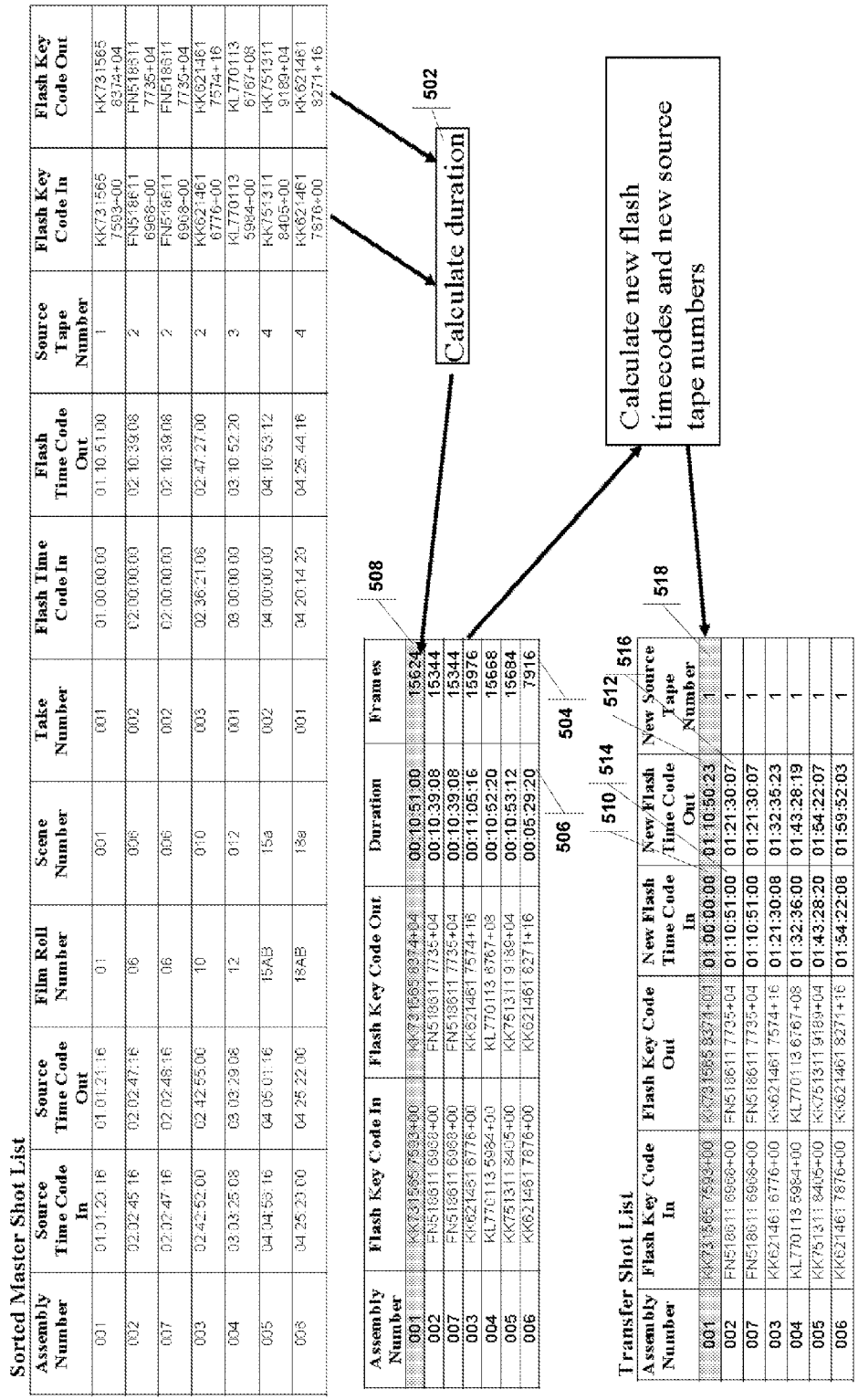
FIG. 4 illustrates the formation of the Transfer Shot List according to the present invention.

Once all the SSL entries are correlated to the appropriate STL entries to the form the MSL, the MSL is sorted by film roll number and then by flash keycode IN at step 400. This sorted MSL is used to create a transfer shot list (TSL) in step 500 that includes a new flash timecode IN/OUT, and new source tape number. With reference to FIG. 4, calculate the duration of the flash segment for each entry in the sorted MSL 502. The duration may be calculated by subtracting the flash keycode IN from the flash keycode OUT 504 and adding one frame because both the IN and OUT frames are used in the segment. Alternatively, subtract the flash timecode IN from the flash timecode OUT 506, also adding one frame. Now the TSL can be constructed. Beginning with the first entry in the sorted MSL 508, assign an arbitrary new flash timecode IN, say 01:00:00:00, 510, calculate the new flash timecode OUT 512 by adding the duration to the new flash timecode IN. For the second entry on the sorted MSL use the previous entry's new flash timecode OUT (plus one frame) as the new flash timecode IN 514, and calculate the new flash timecode OUT 516 by adding the duration of the second MSL entry to that new flash timecode IN. Continue until all the MSL entries have been processed. Also, assign a new source tape number 518 and continue with that new source tape number until it is filled (usually 1 hour), as determined by the flash timecode OUT. When that new source tape is filled, begin another new tape number, and reset the first new flash timecode IN for the second tape. If a TSL entry would wrap over from the end of one new source tape to another new source tape, then assign that entry as the first entry for the next new source tape number. Continue with as many new source tapes numbers as necessary to completely account for all TSL entries.

A FF-HDTV-TL 20 is created at step 600 by parsing out the relevant data from the TSL, including the film roll number, flash keycode IN/OUT, new source tape number and the new flash timecode IN/OUT, with duplicative entries discarded.

Figure 5:
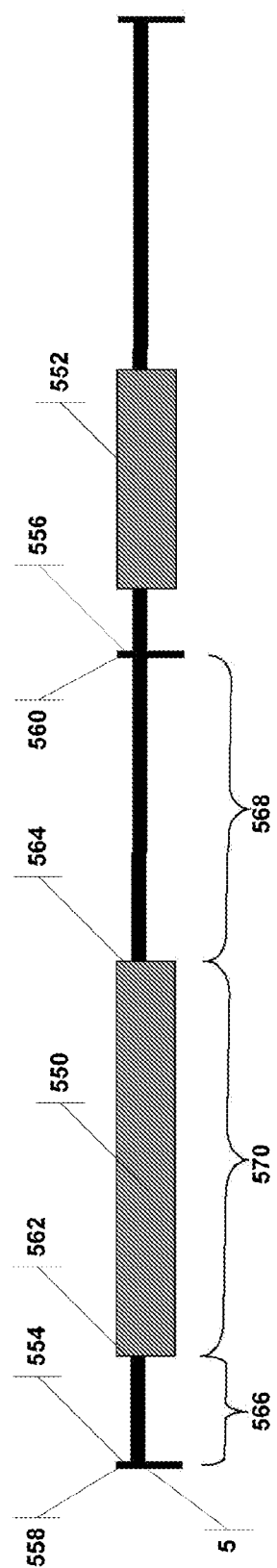
FIG. 5 illustrates a segment of file footage as telecined to a NTSC source tape.

The TSL from step 500 is also used in step 700 to create a sorted assembly list (SAL) that includes new source timecode IN/OUT and, optionally, the exact keycode IN and exact keycode OUT (i.e., the labels imprinted, plus offsets, on the start frame and stop frame, respectively) for each film segment actually used in the NTSC edited master 12. FIG. 5 illustrates two film segments 550 and 552 as they appear on an NTSC source tape 5 telecined using the NTSC-TL 10. For a particular entry in the TSL that matches the NTSC source tape 5, the entry will contain the flash timecode IN 554 and a flash timecode OUT 556. Each of those points will also correspond to the flash keycode IN 558 and flash keycode OUT 560. That same TSL entry will also contain a source timecode IN 562 and source timecode OUT 564, that point to the start position and stop position, respectively, for the first film segment 550. Because the flash timecode IN 554 and source timecode IN 562 are known, the gap 566 can be calculated by subtracting the former from the latter. The gap 566 is commonly known as a leader handle, and will be referred to as such hereafter. Similarly, because the flash timecode OUT 556 and source timecode OUT 564 are known, the tailing handle 568 can be calculated by subtracting the latter from the former. Finally, subtracting the source timecode IN 562 from the source timecode OUT 564 yields the segment duration 570. From any two of the leader handle 566, the tailing handle 568 and the duration 570, the new source timecode IN 562 and new source timecode OUT 564 can be calculated. For example, adding the leader handle 566 to the new flash timecode IN, yields the new source timecode IN; and subtracting the tailing handle 568 from the new flash timecode OUT, yields the new source timecode OUT. Alternatively, the new source timecode IN may be calculated using the leading handle 566, as just discussed, and the new source timecode OUT can be calculated by adding the duration 570 to the new flash timecode IN. In yet another alternative, the new source timecode OUT may be calculated using the tailing handle 568, as just discussed, and the new source timecode IN can be calculated by subtracting the duration 570 from the new source timecode OUT. Other mathematical manipulations of the leader handle 566, tailing handle 568 and the duration 570 exist to arrive at the new source timecode IN/OUT, and those variations would be known to someone skilled in the art.

The exact keycode IN and exact keycode OUT may also be calculated at this point. While exact keycodes are not necessary for the FF-HDTV-TL 20 constructed in step 600, they are helpful in constructing the OPT-HDTV-TL 21 described below with reference to steps 900, 1000 and 1100 and FIGS. 6-8. To determine the exact keycode IN/OUT, you need only two of the three of the leader handle 566, the tailing handle 568 and the duration 570. For example, adding the leader handle 566 (converted to number of frames) to the flash keycode IN 558, yields the exact keycode IN; and subtracting the tailing handle 568 (converted to number of frames) from the flash keycode OUT 560, yields the exact keycode OUT. Alternatively, the exact keycode IN may be calculated using the leading handle 566, as just discussed, and the exact keycode OUT can be calculated by adding the duration 570 (converted to number of frames) to the exact keycode IN. In yet another alternative, the exact keycode OUT may be calculated using the tailing handle 568, as just discussed, and the exact keycode IN can be calculated by subtracting the duration 570 (converted to number of frames) from the exact keycode OUT. Other mathematical manipulations of the leader handle 566, tailing handle 569 and the duration 570 exist to arrive at the exact keycode IN/OUT, and someone skilled in the art would know those variations. Other methods of determining the exact keycode IN and OUT are known in the art, generally by the name film matchback, and may be used in conjunction with the method for converting and optimizing editing files described herein.

A HDTV-EDL 22 is created at step 800 by correlating the NTSC-EDL 13 entries with the SAL entries created in step 700 using the unique assembly number. For each correlated entry, replace the NTSC-EDL 13 source timecode IN/OUT with the SAL new source timecode IN/OUT, replace the NTSC-EDL 13 destination timecode IN/OUT with the SAL converted destination timecode IN/OUT, and replace the NTSC-EDL 13 source tape number with the new source tape number. Replacing this information in the existing NTSC-EDL 13, results in a new HDTV-EDL 22 that contains all the information needed to match to the FF-HDTV-TL 20 created in step 600.

The foregoing method described with respect to FIGS. 1-5 uses flash IN and flash OUT points from the original NTSC-TL 10. While this method does provide a converted FF-HDTV-TL 20, it does not necessarily provide an optimized TL. Specifically, the flash IN and OUT from the original NTSC-TL 10 may include several segments that are not used in the NTSC edited master 12, and thus also not used in the HDTV edited master 28. The over-inclusive nature of the NTSC-TL 10 is described above with reference to FIGS. 10 and 11. The flash IN and OUT from the original NTSC-TL 10 may also include excessive leader and tailing handles that are not used in the HDTV edited master 28.

Figure 6:
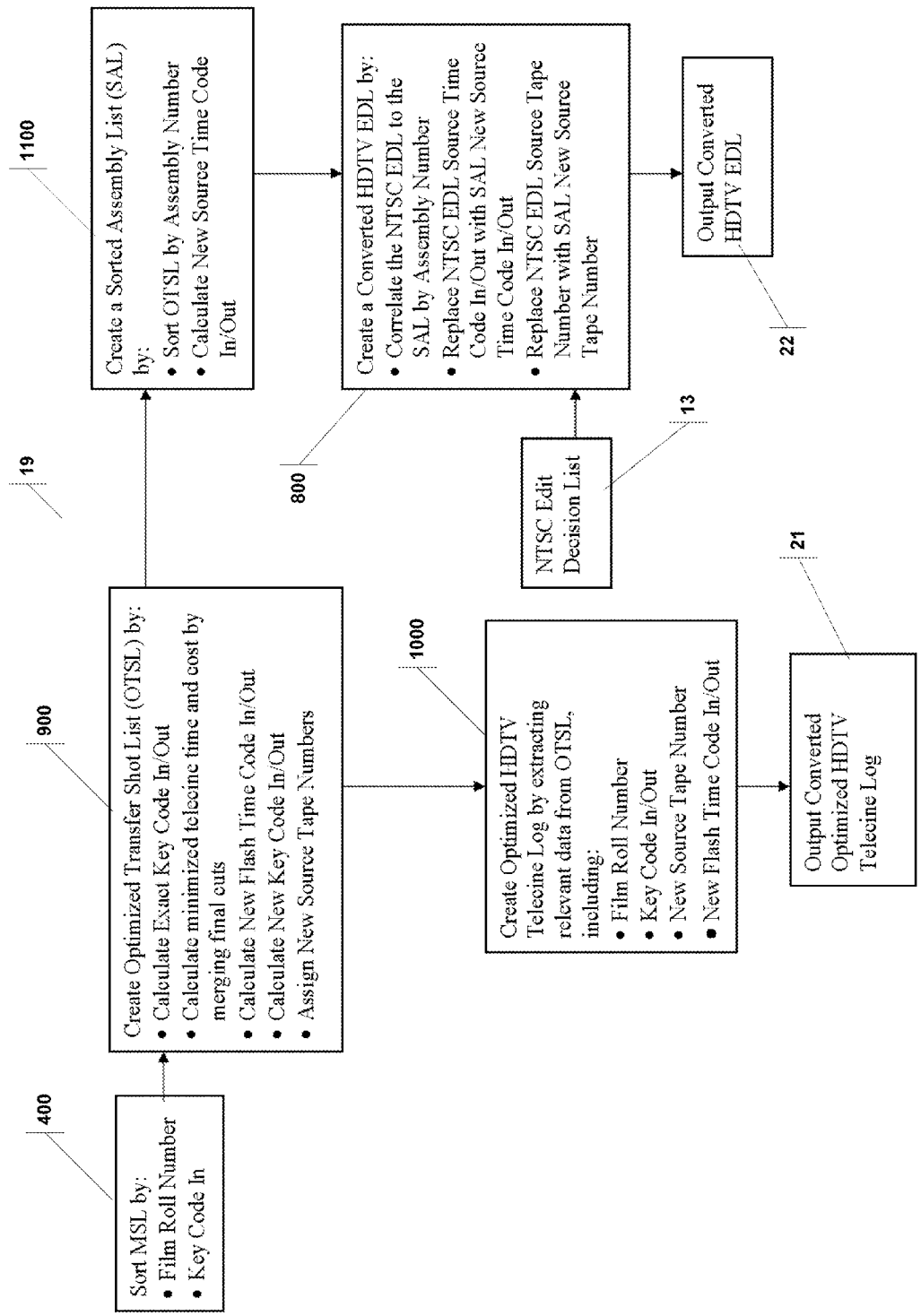
FIG. 6 is a block diagram of a flow chart of a method of converting NTSC editing files to optimized HDTV editing files according to the present invention.

From the exact start frame and stop frame of the final segments can be calculated as described above in steps 500 and 700, the optimized conversion method described below can now construct an optimized TL that strives to telecine only those segments that are actually used. FIG. 6 illustrates a flow chart of a preferred embodiment of the HDTV conversion module 19 that generates such an OPT-HDTV-TL 21. Step 400 is the same as described above and results in a sorted MSL. At step 900, an optimized Transfer Shot List (OTSL) is constructed using the MSL to calculate the exact keycode IN/OUT for the final segments in the same manner as described above in reference to steps 500 and 700. At this point, therefore, the OTSL contains a list of exact keycodes IN/OUT that describes exactly the film segments needed for the HDTV edited master 28.

Because the telecine costs are driven primarily by the telecine operator's time, it is necessary to reduce telecine time to optimize costs. Telecine time is affected by several factors, including the most obvious contributor—the amount of footage to be telecined. Other factors also play a role, including the number times the telecine operator must start and stop the telecine bay and the relative position of the final segments. The former is important because each start and stop requires that the telecine operator re-cue the start position for the next segment, often taking several minutes. The latter factor becomes important when two segments are located on the same film roll, but at opposite ends of the film roll; this requires the telecine bay operator to transfer the first segment and then fast forward through the entire film roll to the second segment before transferring that segment. Given that starting/stopping and fast forwarding cost time, it may be more efficient to merge segments that are close to each other and telecine those segments as one segment—thus reducing telecine time and lowering costs.

Figure 7:
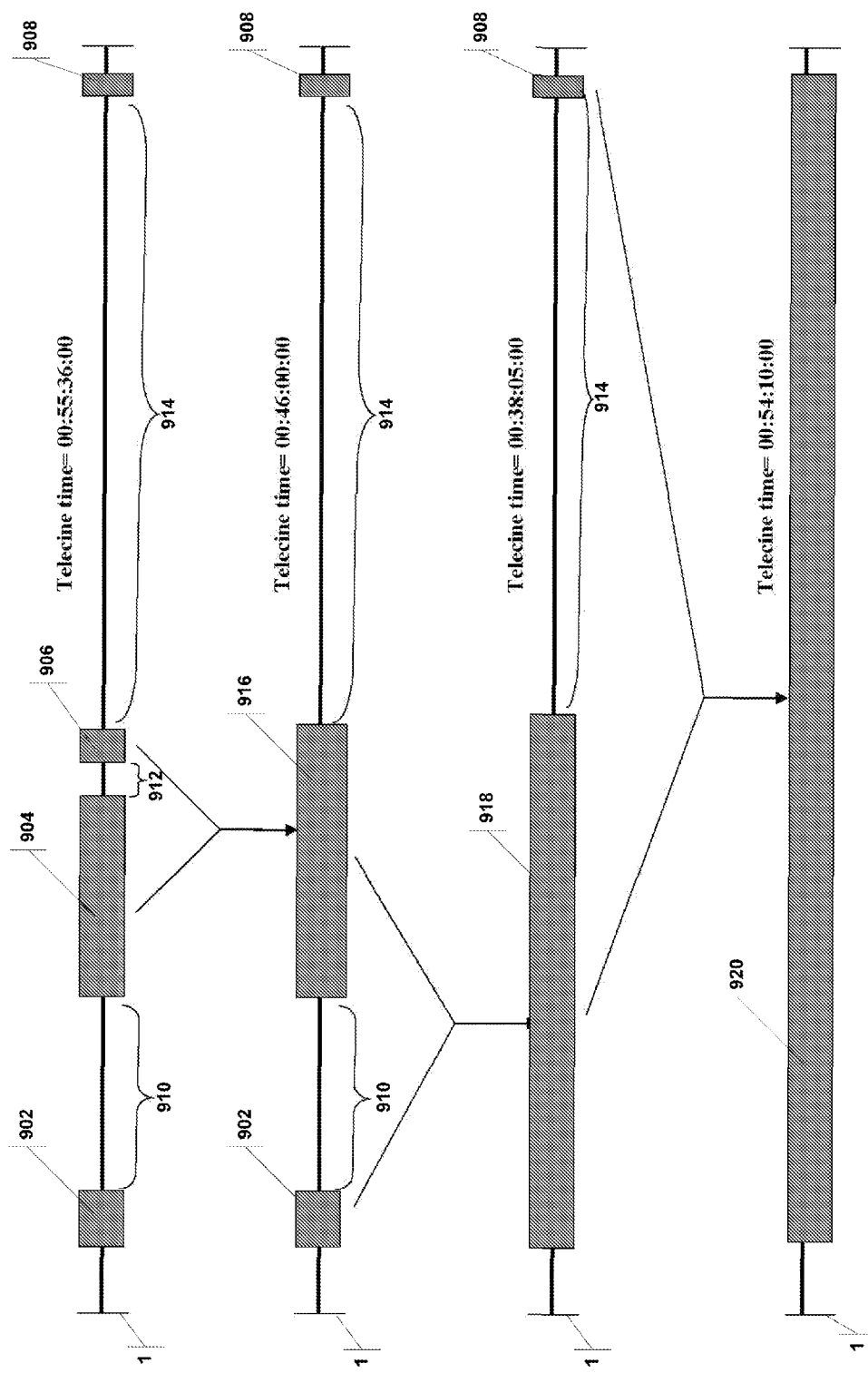
FIG. 7 illustrates a method for optimizing a telecine log according to the present invention.

A preferred embodiment creates an OPT-HDTV-TL 21 by checking various merging combinations and calculating costs for each of those combinations. Specifically, the preferred embodiment sorts the OTSL by film roll number and then by exact keycode IN. Now for each film roll, calculate the gap length between the segments needed for the HDTV edited master 28. FIG. 7 illustrates an original film roll 1, the segments (902, 904, 906, and 908) needed for the HDTV edited master 28, and the respective gap lengths (910, 912 and 914) between the segments. For the purposes of illustration, assume that segment 902 is 00:01:00:00 long, while segments 904, 906 and 908 are 00:03:00:00, 00:00:45:00, and 00:00:30:00 long, respectively. Also assume that the first gap length 910 is 00:03:00:00 long while gap lengths 912 and 914 are 00:00:45:00 and 00:35:00:00 long, respectively. Also, assume that the HDTV telecine bay 23 requires a quarter of the time to fast forward to relevant segments and telecines in real-time those relevant segments. Finally, assume that each start/stop requires 10 minutes and that a 5 second leader handle and a 5 second tailing handle flank each segment. While handles are preferable to give the telecine operator a small margin of error when telecining the film, handles are not necessary or may be assigned an arbitrary length. Now calculate a time for telecining the film roll 1 as four separate segments using the following equation:

$$(4 \text{ segments}*10 \text{ minutes/segment})+(00:38:45.00 \text{ gap time}*0.25)+(00:05:15.00 \text{ total segment time})+ (40 \text{ second total handle time}) \quad (1)$$

Where the first term accounts for the telecine start/stop delays, the second term accounts for the time needed to fast forward to relevant segments, the third term accounts for the time needed to perform real-time telecine and the fourth term accounts for the handles that are also telecined.

Equation (1) results in a telecine time of 00:55:36:00. Now merge the closest two segments (i.e., 904 and 906) to form a new segment 916 that envelopes gap length 912, resulting in a new segment length of length 00:04:30:00. Recalculate the time for telecining this film roll 1 as three separate segments using equation (1), with modified input variables:

$$(3 \text{ segments}*10 \text{ minutes/segment})+(00:38:00.00 \text{ gap time}*0.25)+(00:06:00.00 \text{ total segment time})+ (30 \text{ second total handle time}) \quad (2)$$

yielding a telecine time of 00:46:00:00. Now merge the next two closest segments 916 and 902 to form segment 918, yielding a telecine time of 00:38:05:00. Finally, merge the last two remaining segments 918 and 908 to form segment 920, yielding a telecine time of 00:54:10:00. While the cost equations (1) and (2) have four components, these equations may be simplified to account for one a few terms, or may be expanded to account for other factors that may include the cost associated with the potential damaging of the negatives and the efficiency (or inefficiency) of the telecine operator.

From this iterative process it is clear that treating the four original segments (902, 904, 906 and 908) as two segments (918 and 908) results in the shortest telecine time of 00:38:05:00. This method should be repeated for each film roll. While it is preferable to continue the merging segments until only one segment remains (i.e., the forth pass in FIG. 7 formed one segment 920), it may be possible to stop merging when only a portion of the segments have been merged. For example, if the cost continues to trend downward for each successive merge, then it would be preferable to continue with at least another merge pass. If however, the cost calculation appears to reach a bottom and is then only trending upward with every successive merge, then it is likely that the disclosed method has already found the minimum and need not continue with another merge pass. It is possible, however, that several local minima exist, such that looking at trends may not identify the absolute minimum. For example in a film roll with 60 possible merge passes, a local minimum may exist at the $32^{nd}$ merge pass and after that, costs trend upwards until the $41^{st}$ merge pass when the costs begin to trend downwards and reach an absolute minimum cost at the $49^{th}$ merge pass. Had merging stopped with the $32^{nd}$ pass, the absolute minimum would have been missed. Therefore, it is often preferable to complete all merges, which would identify the absolute cost minimum.

While it is preferable to check the various combinations to reduce time and costs, this optimization is not necessary. It is possible to assign any arbitrary leader handle or tailing handle, or no handles at all to the exact keycodes as calculated for the various segments as shown above.

In either the optimization method or the arbitrary handle method, you must construct a TL that corresponds to the segments, whether merged or not. For each segment, merged or not, calculate the new flash keycode IN by subtracting the leading handle length (converted to frames) from the lowest exact keycode IN associated with the segment, and calculate the flash keycode out by adding the tailing handle (converted to frames) to the largest keycode OUT associated with the segment. Continue this process for each segment in each film roll. Then calculate the new source tape numbers and new flash timecode IN/OUT as described with reference to step 500 above. For each entry in the OTSL (i.e., entries that represent segments actually used the edited master), correlate the exact keycode IN/OUT to the new flash keycode IN/OUT, and append the corresponding new flash keycode IN/OUT, new flash timecode IN/OUT and new source tape number to the OTSL.

In step 1000, the relevant information, such as the film roll number, the new flash timecode IN/OUT, the new source tape number, and the new flash keycode IN/OUT, are parsed out from the OTSL from step 900, with duplicative entries discarded, to form the converted OPT-HDTV-TL 21.

Figure 8:
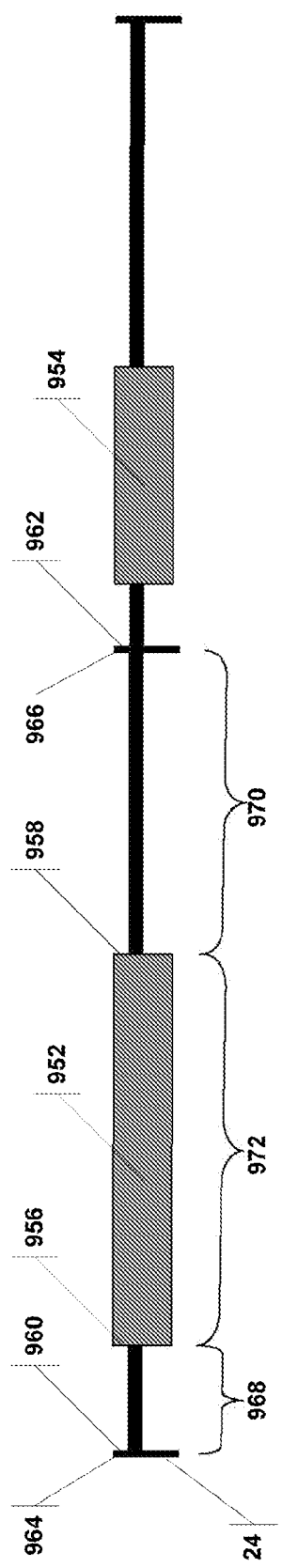
FIG. 8 illustrates a segment of file footage as telecined to a HDTV source tape according to an optimized HDTV telecine log.
Figure 9:
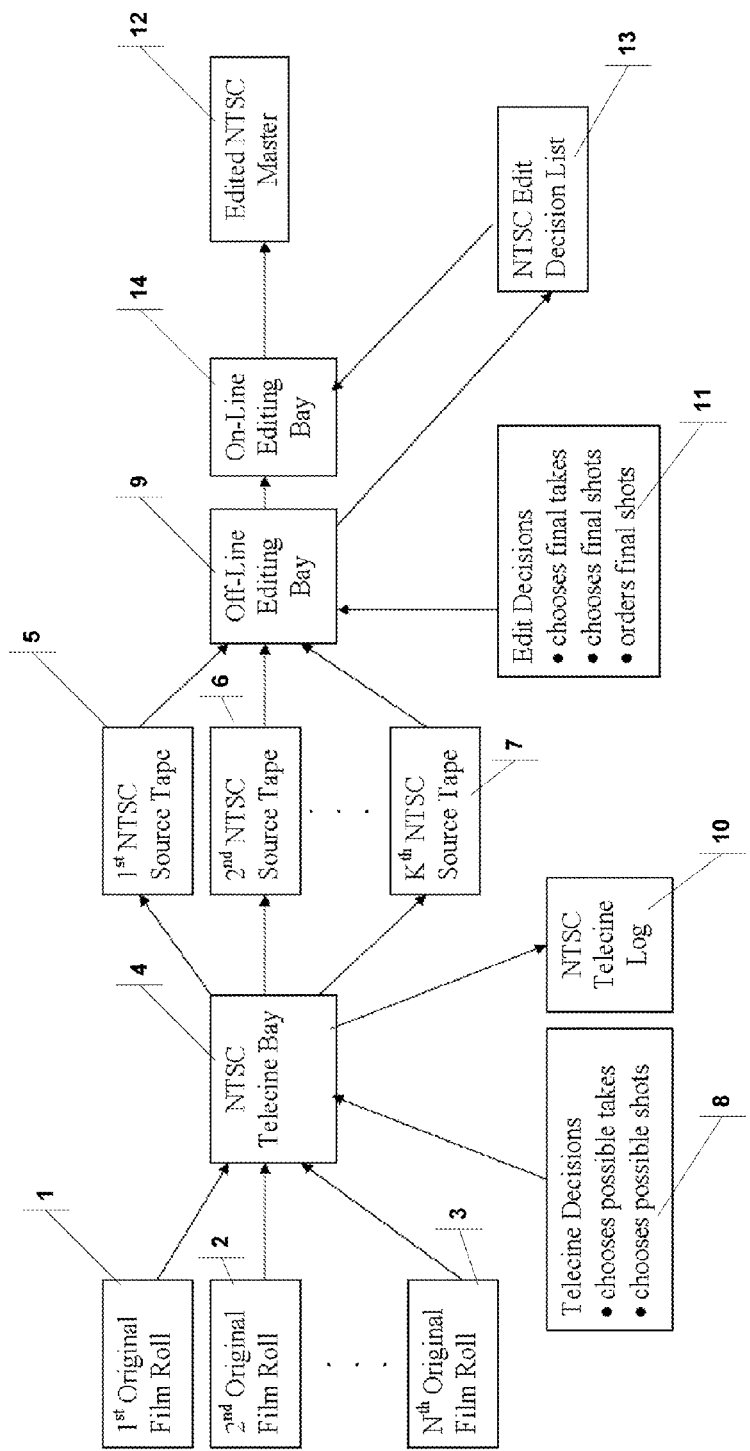
FIG. 9 is a block diagram showing the prior art method of a NTSC program assembly.

Finally, in step 1100 the OTSL from step 900 is used to form a SAL that contains the new source timecode IN/OUT. FIG. 8 illustrates two film segments 952 and 954 as they appear on an HDTV source tape 24 telecined using the OPT-HDTV-TL 21 constructed in step 1000 above. Each OTSL entry contains exact keycode IN 956, exact keycode OUT 958, new flash keycode IN 960, new flash keycode OUT 962, new flash timecode IN 964 and new flash timecode OUT 966. Using a method similar to that described above in step 500, the leading handle 968 can be calculated by subtracting the new flash keycode IN 960 from the exact keycode IN 956. Similarly, the tailing handle 970 is calculated by subtracting the exact keycode OUT 958 from the new flash keycode OUT 962. Finally, subtracting the exact keycode IN 956 from the exact keycode OUT 958 yields the segment duration 972. From any two of the leader handle 968, the tailing handle 970 and the segment duration 972, the new source timecode IN and new source timecode OUT can be calculated in the same manner as discussed above in step 500.

The SAL resulting from step 1100 is passed to step 800, already discussed, to create the converted HDTV-EDL 22.

The optimized HDTV-TL method described with reference to step 900 and FIG. 7 can also be used in non-conversion applications. In fact, the OPT-HDTV-TL 21 is an optimized pull (OPT-PL) list that minimizes the costs for processing the film segments actually used in a final assembled product. That product may be an edited HDTV master 28 as discussed above, or that final product may be a motion picture. In other words, the OPT-PL (or TL) method may be used in motion picture post-production. When a director shoots a particular scene, the director often asks that the scenes shot be telecined, which transfers the negative image into a positive image in video format. Again, as discussed above, the telecine bay 8 produces a TL for the segments transferred to the video source tapes. The director, much like in the NTSC program assembly and the HDTV program assembly, then selects the film segments that should be used in the final motion picture and the editing bay will generate an EDL recording the director's decisions. With the aid of the OPT-PL (or TL) method described above, the TL and the EDL generated in the motion picture post-production can be used to find the exact frames that will be used for the final motion picture. At this point, however, the process departs from the video program assembly discussed above.

Instead of using the exact frames to optimize telecine time/cost, they can be used to optimize film print time/costs. In film post-production, the original negative must be converted to a positive film image and then assembled into a final motion picture. This process is known as printing the negative. Printing, however, is very expensive which is why directors often use telecine as an intermediate method to narrow down the negative segments that truly need to be printed. Much of the expense in negative printing, as in telecine, stems from the time the operator must spend cueing the proper film segments and monitoring the printing process. Not only do cueing and other movement of the film cause time and expense, it places the film in peril of scratching or other destruction. Thus, just as in telecine, it is often advantageous to merge film segments together to minimize printing time, and consequently minimizing printing costs. By checking various merging combinations and calculating costs for those combinations, as described above with respect to telecine, the method finds the lowest cost and creates an optimized print pull list (OPT-PPL), which is another variant of the OPT-PL. The OPT-PPL can then be given to a print operator that will print the precise film segments, from the appropriate film rolls. Those prints, along with the exact frame segments and assembly numbers generated by the method, are then given to a conformist that assembles the final motion picture accordingly.

The methods described above could be implemented using a computer or other computing device. In this case, the NTSC-EDL 13 and the NTSC-TL 10 could be inputted into the computer programmed according to the method, and the computer would generate the converted HDTV-EDL 22 and the FF-HDTV-TL 20 or the OPT-HDTV-TL 21. Similarly, the properly programmed computer could also generate the OPT-PPL.

The embodiments described above have been directed at conversion from NTSC to HDTV from 35 mm film. The method, however, is not limited to these formats. Rather the method can be used to convert any motion picture format, including but not limited to 70 mm, 65 mm, 35 mm, 16 mm and 8 mm of any perforation span. With the new gauge, along with the perforations per frame, or alternatively the frames per keyfoot, and the frame rate (i.e., FPS), the method above may be adjusted to convert the editing files associated with the new film gauge.

The specification and drawings are to be regarded in an illustrative rather than a restrictive sense. It will, however, be evident that various modifications and changes may be made thereunto without departing from the broader spirit and scope of the invention as set forth in the claims.

The invention claimed is:

1. A method for converting an editing file, wherein the editing file comprises an edit decision list (EDL) and a telecine log (TL), wherein the EDL contains a plurality of EDL entries and the TL contains a plurality of TL entries, wherein the method comprises:
    (a) correlating the EDL to the TL based on the plurality of EDL entries and the plurality of TL entries;
    (b) determining the location of a desired motion picture segment based on the correlation between the EDL and TL; and
    (c) constructing a converted telecine log (CTL) that contains a new flash data that points to the location of the desired motion picture segment.

2. The method of claim 1, further comprising:
    (d) constructing a new source data, wherein the new source data points to the location of a copy of the desired motion picture segment; and
    (e) constructing a converted edit decision list (CEDL) based on the new source data and the EDL.

3. The method of claim 1, wherein the plurality of EDL entries contains source timecode data, and the plurality of TL entries contains flash timecode data, wherein the correlation of step (a) is based on the source timecode data and the flash timecode data.

4. The method of claim 2, wherein the plurality of EDL entries contains source timecode data, and the plurality of TL entries contains flash timecode data, wherein the new source data is constructed by:
    (f) calculating from the source timecode data and the flash timecode data at least two lengths selected from a group consisting of a leader handle, a tailing handle and a segment duration; and
    (g) calculating the new source data based on the flash timecode data and the at least two lengths selected in step (f).

5. The method of claim 1, wherein the plurality of EDL entries contains source timecode data, and the plurality of TL entries contains flash timecode data, wherein step (b) is performed by:
    (d) calculating from the source timecode data and the flash timecode data at least two lengths selected from a group consisting of a leader handle, a tailing handle and a segment duration;
    (e) calculating an exact keycode IN and an exact keycode OUT based on the flash keycode data and the at least two lengths selected in step (b), wherein the exact keycode IN and the exact keycode OUT define a start location and a stop location for the desired motion picture segment.

6. The method of claim 1, wherein the CTL is a flash-to-flash CTL.

7. The method of claim 1, further comprising populating a recording media according to the CTL.

8. The method of claim 2, further comprising populating an edited master according to the CEDL.

9. The method of claim 1, further comprising populating an edited master based on the CTL and the EDL.

10. The method of claim 1 wherein the editing file is an NTSC file and the CTL is a high definition CTL (HD-CTL).

11. The method of claim 10 wherein the HD-CTL is based on 24 fps.

12. A computer readable medium having stored thereon one or more sequences of instructions for causing one or more microprocessors to perform the steps for converting an editing file, wherein the editing file comprises an edit decision list (EDL) and a telecine log (TL), wherein the EDL contains a plurality of EDL entries and the TL contains a plurality of TL entries, wherein the steps comprise:

(a) correlating the EDL to the TL based on the plurality of EDL entries and the plurality of TL entries;
(b) determining the location of a desired motion picture segment based on the correlation between the EDL and TL; and
(c) constructing a converted telecine log (CTL) that contains a new flash data that points to the location of the desired motion picture segment.

13. The computer readable medium of claim 12, wherein the steps further comprise:
(d) constructing a new source data, wherein the new source data points to the location of a copy of the desired motion picture segment; and
(e) constructing a converted edit decision list (CEDL) based on the new source data and the EDL.

14. The computer readable medium of claim 12, wherein the steps further comprise populating a recording media according to the CTL.

15. The computer readable medium of claim 13, wherein the steps further comprise populating an edited master according to the CEDL.

16. The computer readable medium of claim 12, wherein the steps further comprise populating an edited master based on the CTL and the EDL.

17. A method for constructing an optimized pull list (OPT-PL) wherein the method comprises:
(a) identifying the location for each of a plurality of film segments;
(b) merging two of the plurality of film segments, resulting in a merged film segment and a remaining plurality of non-merged film segments;
(c) calculating a cost to transfer the merged film segment and the remaining plurality of non-merged film segments, recording the cost in a plurality of recorded costs;
(d) repeating steps (b) and (c) until a portion of the plurality of film segments has been merged into the merged film segment; and
(e) constructing the OPT-PL based on the plurality of recorded costs.

18. The method of claim 17 further comprising:
(f) providing an editing file wherein the editing file comprises an edit decision list (EDL) and a telecine log (TL), wherein the EDL contains a plurality of EDL entries, and the TL contains a plurality of TL entries; and
(g) step (a) is based on correlating the EDL to the TL based on the plurality of EDL entries and the plurality of TL entries.

19. The method of claim 17 or 18, wherein the transfer of step (c) is telecine and the method further comprises constructing an optimized converted telecine log (OPT-TL) based on the OPT-PL; and constructing a converted edit decision list (CEDL) based on the OPT-PL.

20. The method of claim 17, further comprising populating a recording media according to the OPT-PL.

21. The method of claim 19, further comprising populating an edited master according to the CEDL.

22. The method of claim 17 wherein step (b) further comprises merging the closest two of the plurality of film segments.

23. The method of claim 17, wherein the transfer of step (c) is a print and the method further comprises printing the plurality of film segments based on the OPT-PL.

24. The method of claim 17 further comprising:
(f) generating a plurality of relative distances between each of the plurality of film segments; and
(g) wherein step (b) further comprises merging the plurality of film segments based on the plurality of relative distances.

25. The method of 17 wherein the portion is based on a trend in the plurality of recorded costs.

26. The method of claim 17 wherein the OPT-PL is an optimized high definition telecine log (OPT-HD-TL).

27. The method of claim 26 wherein the OPT-HD-TL is based on 24 fps.

28. A computer readable medium having stored thereon one or more sequences of instructions for causing one or more microprocessors to perform the steps for constructing an optimized pull list (OPT-PL) wherein the steps comprise:
(a) identifying the location for each of a plurality of film segments;
(b) merging two of the plurality of film segments, resulting in a merged film segment and a remaining plurality of non-merged film segments;
(c) calculating a cost to transfer the merged film segment and the remaining plurality of non-merged film segments, recording the cost in a plurality of recorded costs;
(d) repeating steps (b) and (c) until a portion of the plurality of film segments has been merged into the merged film segment; and 29. The computer readable medium of claim 28, wherein the steps further comprise:
(f) providing an editing file wherein the editing file comprises an edit decision list (EDL) and a telecine log (TL),wherein the EDL contains a plurality of EDL entries, and the TL contains a plurality of TL entries; and
(g) step (a) is based on correlating the EDL to the TL based on the plurality of EDL entries and the plurality of TL entries.

30. The computer readable medium of claims 28 or 29, wherein the transfer of step (d) is telecine and the steps further comprise constructing an optimized converted telecine log (OPT-TL) based on the OPT-PL;and constructing a converted edit decision list (CEDL) based on the OPT-PL.

31. The computer readable medium of claim 28, wherein the steps further comprise populating a recording media according to the OPT-PL.

32. The computer readable medium of claim 30, wherein the steps further comprise populating an edited master according to the CEDL.

33. The computer readable medium of claim 28 wherein step (b) further comprises merging the closest two of the plurality of film segments.

34. The computer readable medium of claim 28 wherein the transfer of step (c) is a print and the steps further comprise printing the plurality of film segments based on the OPT-PL.

35. The computer readable medium of claims 28, wherein the steps further comprise:
(f) generating a plurality of relative distances between each of the plurality of film segments; and
(g) wherein step (b) further comprises merging the plurality of film segments based on the plurality of relative distances.

36. The computer readable medium of claims 28 wherein the portion is based on a trend in the plurality of costs.

37. The method of claim 7 or 20, wherein the recording media is adapted to record in high definition.

38. The method of claim 8, 9 or 21, wherein the edited master is in high definition.

* * * * *